Feb. 12, 1935.  W. LIVINGSTON ET AL  1,990,947
ELECTRICAL RECTIFIER
Filed April 21, 1933
Fig. 1.
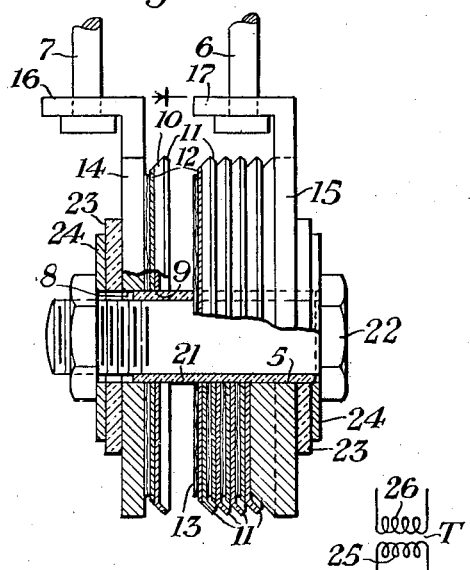
Fig. 2.
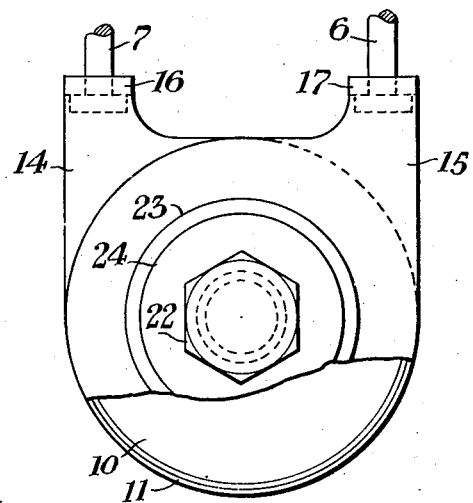
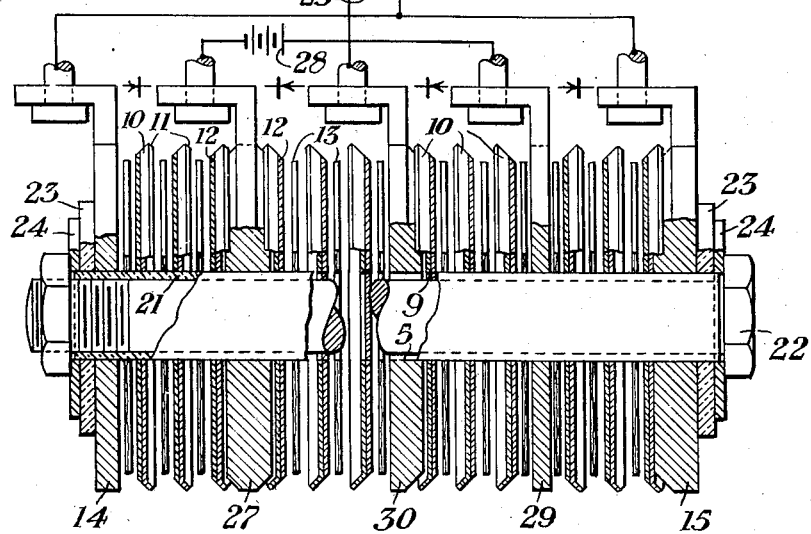
Fig. 3.
INVENTORS
John W. Livingston and
Mortimer B. Cameron.
BY
THEIR ATTORNEY Patented Feb. 12, 1935

1,990,947

UNITED STATES PATENT OFFICE 1,990,947

ELECTRICAL RECTIFIER

John W. Livingston, Wilkinsburg, and Mortimer B. Cameron, Edgewood, Pa., assignors to The Union Switch & Signal Company, Swissvale, Pa., a corporation of Pennsylvania Application April 21, 1933, Serial No. 667,216

6 Claims. (Cl. 175—366)

Our invention relates to electrical rectifiers, and particularly to dry contact rectifiers such for example as rectifiers of the type disclosed and claimed in the United States Letters Patent No. 1,640,335, granted to L. O. Grondahl, on August 23, 1927.

A feature of our invention is the provision of novel and improved forms of rectifiers whereby wrong assembling of the units and improper connections are prevented.

We will describe certain forms of rectifiers embodying our invention, and will then point out the novel features thereof in claims.

Figs. 1 and 2 of the accompanying drawing are side and end views, respectively, partly in section, of one form of rectifier embodying our invention. Fig. 3 is a typical assembly view, partly in section of rectifier units embodying our invention for a full-wave rectifier. In each of the several views similar reference characters designate similar parts.

Units of the dry contact rectifiers of the type here involved have heretofore comprised a flat disk of metal having a compound or oxide formed on one surface to provide a rectifying junction. Against the layer of compound is pressed a washer of impressionable material, such for example, as lead or tin foil. Electrical connection is made with the compound coating through the medium of this washer to form one electrode, the non-treated surface of the disk being the other electrode of the unit. A commercial rectifier consists of a series of treated disks arranged with the treated surfaces of the disks between two adjacent terminals, all facing in one direction. In assembling the units to form such a commercial rectifier extreme care and inspection is required to assure that a disk is not placed in the series in such manner that the treated surface is facing in reverse direction. Furthermore, after the disks of such a rectifier are assembled, further care and inspection is required to assure that the terminal plates of the assembled stacks are properly connected with the outside terminals, so that the direction of the current flow through the rectifier corresponds with the directional marking usually provided at the outside terminal posts.

In order to obviate these difficulties in assembling and to facilitate the manufacture thereof, we propose to form the metal disk with a flanged rim. The compound is formed on either the outer surface or on the inner surface of the saucer-shaped disk, as appears better, but in either case to be standardized on one side. The terminal plates for the rectifier are each adapted to fit a corresponding surface of the disk and are each provided with a terminal lug designed to fit a corresponding outside terminal post only.

Referring to Figs. 1 and 2, the reference character 10 designates a metal disk provided with a flange 11 to preferably form a saucer-shaped disk or plate. A central aperture 9 is provided for the disk to receive a clamping bolt to be shortly referred to. 12 designates the compound formed on the outer surface of the disk 10 in order to provide the rectifying junction. A soft metal washer 13 is adapted to press against the treated surface in the usual manner to provide suitable electrical connection with that surface. A series of such rectifying units are assembled between two terminal plates 14 and 15 to form a commercial rectifier. The terminal plate 14 is preferably a flat metal disk adapted to fit the washer 13 of the treated surface 12 on the outer side of the disk 10. Plate 14 is also provided with an aperture 8 adapted to align with the aperture 9 of the metal disk. The terminal plate 15 is preferably a metal disk adapted to fit the inner surface of the metal disk 10, and this terminal plate is provided with a central aperture 5 adapted to align with the aperture 9 of the metal disk. The terminal plates 14 and 15 are provided with terminal lugs 16 and 17, respectively, and these lugs are designed to connect with the respective outside terminal posts 7 and 6 as will be readily understood by an inspection of Figs. 1 and 2.

The necessary number of rectifying units each comprising a disk 10 and a washer 11 are assembled on an insulating tube 21 inserted through the aperture 9. The terminal plates 14 and 15 are put in place, and the several parts drawn down in the proper electrical contact by a bolt 22, a fiber washer 23 and a spring washer 24 being preferably placed under both the head and the nut of the bolt. In Fig. 1, however, the parts are illustrated expanded in order that their arrangement may be more readily understood. It is apparent from Figs. 1 and 2 that in assembling the parts of such a rectifier a unit can not be placed in the reverse direction without it becoming at once observed. Furthermore, the group of assembled units can not be fitted between the terminal plates 14 and 15 in the wrong direction without the fact being observed due to the special engaging surfaces of these plates. The terminal plates 14 and 15 are provided with terminal lugs arranged on opposite sides as illustrated in Fig. 2. This arrangement assures their connection with the terminal posts 6 and 7, so that the direction of flow of current through the rectifier corresponds with the directional marking indicated by an arrow.

Fig. 3 discloses a typical full wave rectifier having rectifying units in accordance with our invention. The several parts are illustrated in the drawing separated in order that their arrangement may be more readily understood. It will be understood, of course, that in the completed rectifier the nut of the bolt 22 will be drawn down far enough to effect proper electrical connection between the several parts. The arrangement of this full wave rectifier will best be understood by a description of its operation which is as follows: Assuming the right-hand terminal of the secondary winding 25 of a transformer T, the primary 26 of which is connected with a source of alternating current such as an alternator not shown, to be positive, as it will be during one-half of each cycle of the alternating current, current will flow from the right-hand terminal of the secondary winding 25 to the terminal plate 14 and thence through the rectifying units in the low resistance direction to a terminal plate 27. The direction of flow of current through the rectifying units will be in accordance with the directional marking indicated by the arrow located between the terminal plates 14 and 27. From the terminal plate 27 the current will flow through the load here shown as a battery 28, to a terminal plate 29 on the rectifier, and thence through the rectifying units in the low resistance direction to a terminal plate 30 from which plate it will pass to the opposite or left-hand terminal of the secondary winding 25. The direction of the flow of current through the rectifying units between terminal plates 29 and 30 will be in accordance with the directional marking indicated by the arrow located between these two plates. During the next half cycle of the alternating current the polarity of the secondary winding 25 will be reversed and current will flow from its left-hand terminal to the terminal plate 30 of the rectifier and thence through the rectifying units in the low resistance direction to the terminal plate 27, the flow of current through the rectifying units corresponding to the directional marking indicated by an arrow located between the plates 30 and 27. From the terminal plate 27 current will pass through the battery 28 the same as before to the terminal plate 29 from which point it will pass through the rectifying units assembled between the plates 29 and 15 in the low resistance direction, that is, in a direction corresponding with the directional marking indicated by the arrow located between the plates 29 and 15. From the terminal plate 15 current will pass to the opposite or right-hand terminal of the secondary winding 25.

It is to be noted that in Fig. 3 the rectifying units are arranged in four groups of three units each and that all the units of a group face in the same direction. For example, the three interfitting metal disks comprising the three units for the group at the left-hand end of the rectifier are arranged with their treated outer surface facing toward the terminal plate 14. It is apparent that in assembling the units to form a group no one unit can be inserted in the reverse direction without it being observed. The terminal plates 14, 15, 27, 29 and 30 are each provided with a surface adapted to fit the surface of the corresponding copper disk with which it is to make contact. It will be clear therefore that if these groups of units are accidentally assembled in any arrangement other than the predetermined arrangement it will be so noticeable that it will at once be observed. Furthermore, these several terminal plates 14, 15, 27, 29 and 30 of the rectifier of Fig. 3 will preferably have their terminal lugs located on different sides of the respective plates after the manner illustrated for the terminal plates 14 and 15 of Figs. 1 and 2. With terminal lugs arranged on the different sides of the terminal plates it will be clear that the assembled rectifier of Fig. 3 could not be connected with the outside terminal posts in a reverse direction, and hence the direction of the flow of current through the rectifier will correspond with the directional marking.

Although we have herein shown and described only certain forms of rectifiers embodying our invention, it is understood that various changes and modifications may be made therein within the scope of the appended claims without departing from the spirit and scope of our invention.

Having thus described our invention, what we claim is:

1. A dry contact rectifier comprising a pair of saucer-shaped metal disks each treated on one surface to form a rectifying junction, and said disks treated on the same corresponding surface whereby an alternate arrangement of treated surface and non-treated surface is assured when said disks are serially assembled.

2. A dry contact rectifier comprising a pair of saucer-shaped metal disks each provided with a central aperture, said disks being treated on one surface to form a rectifying junction and both treated on the same corresponding surface, and an insulated bolt to fit said aperture for drawing said disks into electrical contact with an alternate arrangement of treated surface and non-treated surface.

3. A dry contact rectifier comprising a group of saucer-shaped metal disks and each having a central aperture, said disks each treated on one surface to form a rectifying junction and said disks all treated on the same corresponding surface, and an insulated bolt adapted to fit said aperture for drawing said group of disks into electrical contact with the treated and non-treated surfaces for said disks alternate with each other.

4. A dry contact rectifier comprising a group of saucer-shaped metal disks, each disk having a central aperture and treated on one surface to create a rectifying junction, said disks being all treated on the same corresponding surface, a first terminal plate having a central aperture and adapted to fit the outer surface of the disks and not the inner surface, a second terminal plate having a central aperture and adapted to fit the inner surface of the disks and not the outer surface, and an insulated bolt adapted to fit said apertures whereby the assembly of the disks with the treated surface of each disk facing toward said first terminal plate and said second terminal plate fitting the last disk of the group is assured.

5. A dry contact rectifier comprising a group of saucer-shaped metal disks, each disk having an aperture and treated on one surface to create a rectifying junction, said disks being all treated on the same corresponding surface, a first terminal plate adapted to fit the outer surface of said disks only and having a terminal lug, a second terminal plate adapted to fit the inner surface of the disks only and having a terminal lug, means to assemble said disk and plates with all of said disks arranged with their treated surfaces toward the first terminal plate and the second terminal plate engaging the last disk of the group, and terminal posts adapted to connect with the two terminal lugs of said plates.

6. A dry contact rectifier comprising four groups of interfitting metal disks with each disk treated on one surface to provide a rectifying junction, said disks being all treated on the same corresponding surface, a first terminal plate having a surface adapted to fit the treated surface only of the first disk of the first group, a second terminal plate having its surfaces adapted to fit only the non-treated surface of the last disk of the first group and the non-treated surface of the first disk of the second group, a third terminal plate having its surfaces adapted to fit only the treated surface of the last disk of the second group and the non-treated surface of the first disk of the third group, a fourth terminal plate having its surfaces adapted to fit only the treated surface of the last disk of the third group and the treated surface of the first disk of the fourth group, and a fifth terminal plate having a surface adapted to fit the non-treated surface only of the last disk of the fourth group, whereby proper assembly of the disks of each group, and of the groups with the terminal plates is assured.

JOHN W. LIVINGSTON.
MORTIMER B. CAMERON.